United States Patent
Pati et al.

(10) Patent No.: US 12,469,007 B2
(45) Date of Patent: Nov. 11, 2025

(54) AUTOMATIC GENERATION OF A TWO-PART READABLE SUSPICIOUS ACTIVITY REPORT (SAR) FROM HIGH-DIMENSIONAL DATA IN TABULAR FORM

(71) Applicant: Actimize LTD., Ra'anana (IL)

(72) Inventors: Debabrata Pati, Pune (IN); Danny Butvinik, Haifa (IL)

(73) Assignee: Actimize LTD., Ra'anana (IL)

( * ) Notice: Subject to any disclaimer, the term of this patent is extended or adjusted under 35 U.S.C. 154(b) by 440 days.

(21) Appl. No.: 16/986,289

(22) Filed: Aug. 6, 2020

(65) Prior Publication Data
US 2022/0044199 A1    Feb. 10, 2022

(51) Int. Cl.
  *G06Q 10/10*   (2023.01)
  *G06F 40/56*   (2020.01)
  (Continued)

(52) U.S. Cl.
  CPC ............ *G06Q 10/10* (2013.01); *G06F 40/56* (2020.01); *G06N 3/04* (2013.01); *G06N 3/08* (2013.01);
  (Continued)

(58) Field of Classification Search
  CPC .. G06Q 10/10; G06Q 10/06; G06Q 10/06316; G06Q 30/018; G06Q 30/0185;
  (Continued)

(56) References Cited

U.S. PATENT DOCUMENTS

2009/0125369 A1*   5/2009   Kloostra ............... G06Q 40/12
                                                                705/30
2011/0055072 A1*   3/2011   Lee ....................... G06Q 40/08
                                                                705/38
(Continued)

OTHER PUBLICATIONS

Liu et al., An Agent Based Anti-Money Laundering System Architecture for Financial Supervision, Sep. 1, 2007, 2007 International Conference of Wireless Communications, Networking and Mobile Computing (IEEE), pp. 5472-5475 (Year: 2007).*

*Primary Examiner* — Robert D Rines
(74) *Attorney, Agent, or Firm* — SOROKER AGMON NORDMAN RIBA

(57) ABSTRACT

A computerized-method for automatically generating a two-part readable Suspicious Activity Report (SAR) from high-dimensional data in tabular form is provided herein. The computerized-method may include receiving high-dimensional data in tabular form of evidence financial transactions to be reported under Anti Money Laundering (AML) regulations. Then, displaying the received data to a Subject Matter Expert (SME) for ordering each displayed transaction in a predefined construction; Then, training one or more Natural Language Generation (NLG) translation models, for each transaction type, according to a deep learning model. Then, operating the one or more NLG translation models on each transaction type to generate for each transaction type a narrative of SAR; Then, operating a prebuilt summary model on the generated narrative of SAR of each transaction type to generate a summary of the plurality of narratives of SAR; and combining the plurality of narratives of SAR and the summary to one SAR.

7 Claims, 6 Drawing Sheets

(51) Int. Cl.
  *G06N 3/04*      (2023.01)
  *G06N 3/08*      (2023.01)
  *G06Q 10/0631*   (2023.01)
  *G06Q 30/018*    (2023.01)
  *G06Q 40/02*     (2023.01)
  *G06Q 50/26*     (2012.01)

(52) U.S. Cl.
  CPC ..... *G06Q 10/06316* (2013.01); *G06Q 30/018* (2013.01); *G06Q 40/02* (2013.01); *G06Q 50/26* (2013.01)

(58) Field of Classification Search
  CPC ........ G06Q 40/02; G06Q 40/00; G06Q 40/12; G06Q 20/4016; G06Q 50/26
  See application file for complete search history.

(56) References Cited

U.S. PATENT DOCUMENTS

| | | | | |
|---|---|---|---|---|
| 2020/0125574 A1* | 4/2020 | Ghoshal | | G06F 16/24573 |
| 2020/0125992 A1* | 4/2020 | Agarwal | | G06N 3/084 |
| 2020/0184487 A1* | 6/2020 | Pandya | | H04L 63/1441 |
| 2020/0258181 A1* | 8/2020 | Song | | G06Q 20/401 |
| 2020/0311736 A1* | 10/2020 | Song | | G06Q 20/3823 |
| 2021/0158176 A1* | 5/2021 | Wan | | G06F 18/22 |
| 2021/0224922 A1* | 7/2021 | Juban | | G06Q 20/401 |
| 2021/0264272 A1* | 8/2021 | Luo | | G06N 3/084 |
| 2021/0304204 A1* | 9/2021 | Ramesh | | G06Q 20/4016 |
| 2021/0374338 A1* | 12/2021 | Shrivastava | | G06F 40/30 |
| 2022/0005042 A1* | 1/2022 | Shiffman | | G06Q 40/02 |
| 2022/0012742 A1* | 1/2022 | Kielak | | G06Q 40/02 |
| 2023/0255553 A1* | 8/2023 | Weston | | A61B 5/7264 |
| | | | | 600/586 |

\* cited by examiner

Generating Transaction sentences .......

A 250500 CAD Card repayment by local currency cash transaction was done at account#GBP_9999782525527857431B_T2 of tenant code#2000000 originated by DELLUCCI AMERICAN STUDIO S.R.L. on 28-DEC-12 12.00.00.000000000 AM from country code CA.

A 50000 CHF local currency cash withdrawals transaction was done at account#GBP_7646552487597106936l_T2 of tenant code#2000000 originated by IHEART KIDS on 28-DEC-12 12.00.00.000000000 AM from country code CH.

A 250500 CHF Card repayment by foreign currency cash transaction was done at account#GBP_7759839272194085691_T2 of tenant code #2000000 originated by IHEART KIDS on 28-DEC-12 12.00.00.000000000 AM from country code CH.

A 3000 MXN foreign currency monetary instrument deposits transaction was done at account#GBP_8737782450674389053_T2 of tenant code#2000000 originated by DELLUCCI AMERICAN STUDIO S.R.L. on 28-DEC-12 10.00.00.000000000 AM from country code missing.

Generating Transfers sentences ........

A 928931 USD Receive - Money Transfer - Outgoing transaction was done at account#2_912 of tenant code#2000000 originated by Branch of Bank of Martin Luther King on 26-JUN-12 01.32.39.000000000 AM in MXN currency for country code missing in MXN currency for Branch of Bank Of US as benificiery.

A 16311 USD Receive - Money Transfer - Outgoing transaction was done at account#2_089 of tenant code#2000000 originated by Branch of Bank Of England on 28-JUN-12 01.04.15.000000000 AM in MXN currency for country code missing in MXN currency for Branch of BANK OF CHARLOTTE as benificiery.

A 3189 USD Send - Money Order - Incoming transaction was done at account#2_145 of tenant code#2000000 originated by Branch of Bank of Martin Luther King on 29-JUN-12 01.31.17.000000000 PM in USD currency for country code missing in USD currency for Branch of Bank of France as benificiery.

A 3189 USD Send - Express Payment - Outgoing transaction was done at account#2_117 of tenant code#2000000 originated by Branch of Bank of Martin Luther King on 29-JUN-12 01.31.17.000000000 PM in USD currency for country code missing in USD currency for Branch of Bank of France as benificiery.

A 875241 USD Send - Prepaid Cards - Incoming transaction was done at account#2_152 of tenant code#2000000 originated by Branch of Bank of alabama on 07-JUL-12 09.28.33.000000000 PM in USD currency for country code missing in USD currency for Branch of Bank of France as benificiery.

A 344715 USD Send - Express Payment - Outgoing transaction was done at account#2_506 of tenant code#2000000 originated by Branch of Bank of alabama on 07-JUL-12 04.31.26.000000000 PM in USD currency for country code missing in USD currency for Branch of Bank of France as benificiery.

Figure 5

Generating summary .......
Summary is :-

The observed transaction(s) for Account#Name/Number have suspicious characteristics as:-
primarily two types of transaction data were observed in given evidence simple money transactions and money transfers over accounts.
Given transactions started from 2012-06-26 carried on till 2012-12-28.
In all the given transactions 159.0 USD was the smallest amount of currency transfer,875341.0 USD is as the largest amount of currency transfer,in all the given transactions 3437164.826 USD was the total amount of currency transfer.The Given set of transactions deals with 4 different currencies.
Transaction was Send - Express Payment - Outgoing,Different types of transactions involved was Card repayment by local currency cash,Local currency cash withdrawals,Card repayment by foreign currency cash,Foreign currency monetary instrument deposits,Receive - Money Transfer - Outgoing,Send - Money Order - Incoming,Send - Express Payment - Outgoing,Send - Prepaid Cards - Incoming,Send - Cash Payout Services - Outgoing,Send - Money Transfer - Incoming.
The Given set of transactions comprises of 2 different originators,Most transacted originator has been DELLUCCI AMERICAN STUDIO S.R.L.
The Given set of money transfers comprises of 3 different beneficiaries,Most transacted beneficairy has been Branch of Bank of France.

Figure 6

AUTOMATIC GENERATION OF A TWO-PART READABLE SUSPICIOUS ACTIVITY REPORT (SAR) FROM HIGH-DIMENSIONAL DATA IN TABULAR FORM

TECHNICAL FIELD

The present disclosure relates to the field of software process of Natural Language Generation (NLG) and to the field of Recurrent Neural Network (RNN) to transform structured data into natural language. More specifically, the present disclosure relates to NLG and a conversion of tabular data into natural language by the implementation of Seq2Seq approach and SimpleNLG to turn one sequence of characters into another sequence of characters.

BACKGROUND

Most recently, increase in regulatory enforcement actions on Anti-Money Laundering (AML), forced financial institutions to identify and communicate unusual or suspicious financial activity. Current systems of the financial institutions are configured to send alerts in tabular format to end-users such as AML compliance officers. However, the tabular format of the alerts is hard to understand, and it is making the AML compliance officers spend long time struggling to interpret the context of the triggered alerts and later on to manually write Suspicious Activity Reports (SAR)s.

Accordingly, many times, the manual nature of the writing of the compliance reporting results in inconsistent reports and even may lead to costly fines and supervisory action against the financial institution which is an unnecessary expenditure and a misuse of high-value human resources.

Therefore, there is a need for a technical solution that will provide AML personnel with the ability to automatically generate accurate and comprehensive SAR narratives i.e., reports, by transforming complicated data in the form of tabular transaction items and large number of miscellaneous numeric and string attributes into easy-to-understand readable information.

The purpose of the SAR is to report known or suspected violations of law or suspicious financial activity observed by financial institutions subject to the regulations of the Bank Secrecy Act (BSA). In many instances, SARs have been instrumental in enabling law enforcement to initiate or supplement major money laundering or terrorist financing investigations and other criminal cases. Information provided in SARs forms also presents the Department of the Treasury's Financial Crimes Enforcement Network (FinCEN) with a method of identifying emerging trends and patterns associated with financial crimes. The information about those trends and patterns is vital to law enforcement agencies and provides valuable feedback to the financial institutions.

Financial institutions are required to submit SAR forms that are complete, sufficient and timely filed. Due to the complexity of the data that the AML personnel has to interpret and the manual nature of the reports, some financial institutions file SAR forms with blank narratives or that contain incomplete, incorrect, and/or disorganized narratives, which makes further analysis difficult. Such failure to adequately describe the factors which are making a financial transaction or activity suspicious, undermines the very purpose of the SAR and lessens its usefulness to law enforcement. Because the SAR narrative serves as the only free text area for summarizing suspicious activity, it is essential that financial institutions' staff write narratives that are clear, concise, and thorough.

Also, late filings of SAR forms, absence of supplementary SARs, and/or inaccuracies in SARs have an impact upon law enforcement's ability to determine whether a crime was committed or continues to be committed, and the extent of any possible criminal activity that has been committed. Therefore, it is imperative that financial institutions not only file complete and sufficient SARs but that those SARs are filed within the established deadlines.

Various financial industries are now required to file SARs. Each SAR form was specifically designed to accommodate respective institution types e.g., depository institutions, Money Services Businesses (MSBs), securities sector, etc. Despite the fact that these industries use different SAR formats, the basic structure for a SAR narrative is similar.

There is a guidance on preparing a complete and sufficient suspicious activity report narrative. Its purpose is to educate SAR filers on how to organize and write narrative details that maximizes the value of each SAR form by: a) using a simple methodology for evaluating and reporting information for the SAR narrative and why it is important; b) providing a general guideline on how to organize the SAR narrative so that critical details are concise and follow a logical order of presentation; and c) providing respective industries with examples of sufficient and insufficient SAR narratives.

Therefore, there is a need for a technical solution that will automatically transform information in tabular format into a readable text, thus saving human resource and will conform with the guidance on preparing a complete and sufficient suspicious activity report narrative.

Furthermore, there is a need for a technical solution that will generate text without argumentation or any other behavior which mimic human being writing and will provide an easy to read reports for investigators and/or SMEs. The generated text should be presented in a concise simple manner to support industrial requirements and to utilize and expedite financial investigations in scale.

SUMMARY

There is thus provided, in accordance with some embodiments of the present disclosure, a computerized-method for automatically generating a two-part readable Suspicious Activity Report (SAR) from high-dimensional data in tabular form.

In accordance with some embodiments of the present disclosure, in a computerized system comprising a processor and a memory, receiving by the processor, high-dimensional data in tabular form of evidence financial transactions to be reported under Anti Money Laundering (AML) regulations.

Furthermore, in accordance with some embodiments of the present disclosure, the processor may display the received high-dimensional data in tabular form of evidence financial transactions to a Subject Matter Expert (SME) for ordering each displayed evidence financial transaction in a predefined construction.

Furthermore, in accordance with some embodiments of the present disclosure, the processor may further train one or more Natural Language Generation (NLG) translation models, wherein each NLG model of the one or more NLG translation models is trained for a different preconfigured transaction type, according to a deep learning model.

Furthermore, in accordance with some embodiments of the present disclosure, the processor may further operate the one or more NLG translation models on the different preconfigured transaction type of the evidence financial transaction to generate for each transaction type a narrative of SAR;

Furthermore, in accordance with some embodiments of the present disclosure, the processor may operate a prebuilt summary model on the generated narrative of SAR of each transaction type to generate a summary of the narrative of SAR and later combine the plurality of narratives of SAR and the summary of the plurality of narratives of SAR to one SAR.

Furthermore, in accordance with some embodiments of the present disclosure, the deep learning model may be a convolutional Seq2Seq model that is configured to operate a hierarchical attention mechanism, and wherein the prebuilt summary model is using NLGSimple model.

Furthermore, in accordance with some embodiments of the present disclosure, each one of the different preconfigured transaction type is at least one of: international, domestic, Automated Clearing House (ACH) and Peer to Peer (P2P) transfers.

Furthermore, in accordance with some embodiments of the present disclosure, each one of the different preconfigured transaction types is performed via a channel, said channel is selected from: web, mobile, phone, branch, Application Programming Interface (API), Automated Teller Machine (ATM) and Point Of Sale (POS).

Furthermore, in accordance with some embodiments of the present disclosure, the summary may be generated according to key features.

Furthermore, in accordance with some embodiments of the present disclosure, the key features are selected from: a total amount of transferred money from a first preconfigured bank to a second preconfigured bank, a total number of transfers from the first preconfigured bank to the second preconfigured bank or any other aggregated data.

For example, the total sum transferred from bank 'A' to bank 'B' is 100 $ per Web domestic transaction, without specifying 'external' transaction because bank 'A' and bank 'B' are by default external to each other.

Furthermore, in accordance with some embodiments of the present disclosure, the Seq2Seq model may further implement a copying mechanism to handle Out Of Vocabulary (OOV) words.

Furthermore, in accordance with some embodiments of the present disclosure, the summary of the plurality of narratives of SAR may be implemented with a hierarchical attention mechanism to operate on keywords and key sentences level.

Furthermore, in accordance with some embodiments of the present disclosure, each evidence financial transaction may have fields categorized as bid changing fields and tow changing fields.

Furthermore, in accordance with some embodiments of the present disclosure, high changing fields may be tokenized by an attribute name, and low changing fields may be tokenized by a value thereof.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 5 is an example of a two-part readable Suspicious Activity Report (SAR) from high-dimensional data in tabular form, in accordance with some embodiments of the present disclosure; and FIG. 6 is an example of a summary of a two-part readable Suspicious Activity Report (SAR) from high-dimensional data in tabular form, in accordance with some embodiments of the present disclosure.

DETAILED DESCRIPTION

Figure 1:
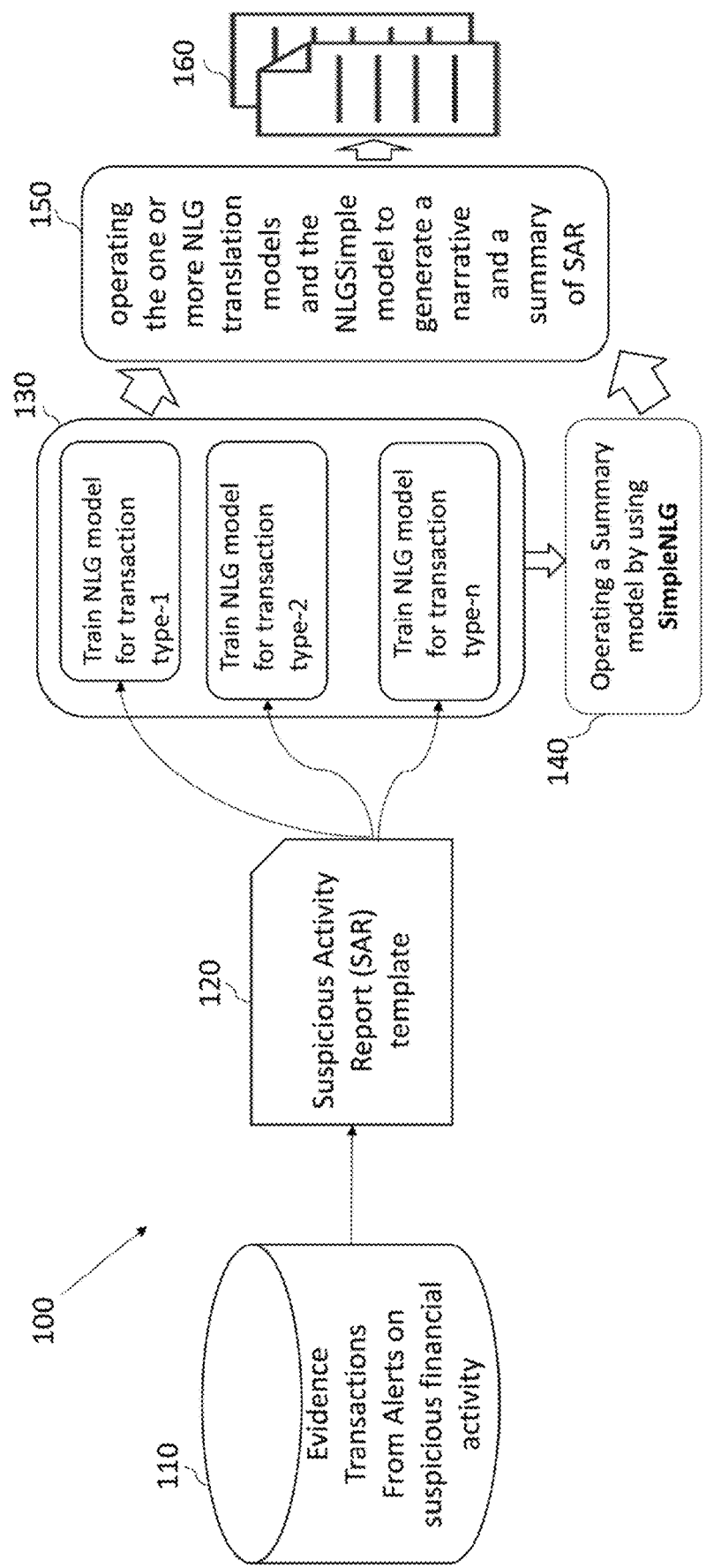
FIG. 1 schematically illustrates automatic generation of a two-part readable Suspicious Activity Report (SAR) from high-dimensional data in tabular form, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, wen-known methods, procedures, components, modules, units and/or circuits have not'been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

As used herein, the terms "model" and "approach" are interchangeable.

As used herein, the term "transaction" refers to an event that is conducted between two sides.

As used herein, the term "transfer" refers to a monetary movement of funds between two sides.

As used herein, the term "convolution" refers to a mathematical operation on two functions e.g., function 'f' and function 'g'. The mathematical operation produces a third function such as 'f*g' which is expressing how the shape of one function is modified by the other function.

As used herein, the term "dot product" refers to an algebraic operation that takes two equal-length sequences of numbers and returns it into a single number.

As used herein, the term "hidden layers" refers to layers in recurrent neural network that their inputs and outputs are masked by the activation function and final convolution.

As used herein, the term "Convolutional Neural Network (CNN)" refers to a recurrent neural network which consists of an input and an output layer, and multiple hidden layers. The bidden layers of a CNN typically consist of a series of convolutional layers that convolve with a multiplication or other dot product. The activation function is commonly a Rectified Linear Unit, i.e., RELU layer, and is subsequently followed by additional convolutions such as pooling layers, fully connected layers and normalization layers, referred to as hidden layers.

As used herein the term "kernel" refers to the kernel of CNN which extracts certain features from an input. It extracts the most representative and non-redundant features that can be fed into the model to make it efficient. These are the most influential or impactful features i.e., columns names. It may be simple straight forward features such as sum of transaction, or it may be complicated features such as an overall sum of transactions of type from bank 'X' to Bank 'Y'.

As used herein, the term "missing fields" refers to fields that are in an expected template but lack any value.

As used herein, the term "long record" refers to a record of a financial transaction that is structured as a predefined template having more characters than the average standard record multiply by 1.25×. For example, if an average length of record is 100 characters, then a record that have more than 100*1.25=125 characters may be considered as a long record.

As used herein the term "one-hot vector" refers to a group of bits where the only allowed composition is having ones, single '1' bit and all the others are '0' bits.

As used herein, the term "input sequence" refers to the characters of all fields in a record of a financial transaction in a preconfigured order, e.g., template.

As used herein the term "Elman network" refers to a three-layer network with the addition of a set of context units. The middle hidden layer is connected to these context units fixed with a weight of one. At each timestep, the input is fed forward and a learning role is applied.

As used herein the term "Seq2Seq approach" refers to encoder-decoder strictures based on Recurrent Neural Networks (RNN), Firstly, the encoder RNN handles an input sequence $x=x_1, \ldots, x_m$, 'm' denotes the number of elements and then obtains the corresponding hidden state '$z$'=$(z_1, \ldots, z_m)$. The decoder RNN uses '$z$' as an input and generates the output $t=(t_1, \ldots, t_n)$ one by one from left to right. When generating the output $t_{i+1}$, the decoder produces a new hidden state $h_{i+1}$ via the previous state $h_i$, along with a representation vector $g_i$ of the previous target language word and a conditional input $c_i$ based on the decoder input '$z$'. Based on the above generic formulation, there are different Seq2Seq models having different RNN type or conditional input.

Many Seq2Seq models implement Long Short Term Memory (LSTM) and Gated Recurrent Unit (GRU) as RNN models, Both RNNs extend Elman. RNNs with a gating mechanism which enables the memorization of information of previous time steps so as to process long-term dependencies. Recently, bi-directional encoders are proposed to capture both future and past contexts. In practice, models with many layers are often equipped with shortcut or residual connection.

When Seq2Seq approach is not implementing an attention mechanism, it may merely utilize the final encoder state $z_m$ by setting the conditional input ci equal to $z_m$ for each i or initializing the input to the first decoder as $z_m$.

As used herein the term "attention mechanism" refers to a mechanism that is used by encoder decoder RNN models to calculate ci as a sum of $(z_1, \ldots, z_m)$ with different weights at each timestep. These weights of the sum are named attention scores. The attention scores enable the decoder in the encoder-decoder RNN models to focus on the different parts of the input sequence when generating the output. To compute attention scores, the attention mechanism compares each encoder's output state $z_j$ with a combination of the last prediction $y_i$ and previous decoder state $h_i$. At the end, the results may be normalized to a distribution over the input sequence.

As used herein the term "softmax operation layer" refers to a function that takes as input a vector '$z$' of '$K$' real numbers and normalizes it into a probability distribution consisting of '$K$' probabilities proportional to the exponentials of the input numbers.

As used herein the term "Hierarchical attention mechanism" refers to a mechanism which identified keywords and key sentences.

As used herein the term "S3" or "Amazon S3" refers to a storage service that offers scalability, data availability, security, and performance.

As used herein the term "non-linearity" refers to non-linear activation functions.

Natural-language generation (NLG) is a computerized process which transforms structured data into natural language. It may be used to automate custom reports. For NLG there is an Application Programming Interface (API) such as SimpleNLG which is a Java API that is designed to facilitate the generation of natural language i.e., human language.

In 2000 Reiter and Dale pipe lined NLG architecture, distinguishing three stages in the NLG process: (i) document planning which includes deciding what is to be said and creating an abstract document that outlines the structure of the information to be presented. (ii) microplanning which includes generation of referring expressions, word choice, and aggregation to flesh out the document specifications; and (iii) realization which includes convening the abstract document specifications to a real text, using domain knowledge about syntax, morphology, etc. As described in "Building Natural-Language Generation Systems", E. Reiter and R. Dale (2000), Cambridge University Press, incorporated by reference.

There are several approaches for current implementations of NLG. One of them is a simple fill-in-the-gap template system for texts that have a predefined structure and need a small amount of data to be filled in with data retrieved from a spreadsheet row, database table entry, etc. However, this approach is quite limited in its use.

Another approach is based on scripts or rules-producing text which is basic gap-filling systems which were expanded with general-purpose programming constructs via a scripting language or by using business rules. This scripting approach, such as using web ten plating languages, embeds a template inside a general-purpose scripting language; thus enabling complex conditionals, loops, access to code libraries, etc. The business rule approaches, which are adopted by most document composition tools, work similarly, but focus on writing business rules rather than scripts. However, even though these approaches are more powerful than the simple till-in-the-gap, such systems still lack linguistic capabilities and cannot reliably generate complex high-quality texts.

Yet another approach is word-level grammatical functions. It is a logical development of template-based systems which is adding word-level grammatical functions to handle with morphology, morphophonology and orthography as well as to handle possible exceptions. These functions made it easier to generate grammatically correct texts and to write complex template systems. But this approach does not operate in the sentence level.

Yet another approach is dynamic sentence generation. It is taking a step from template-based approaches to dynamic NLG by dynamically creating sentences from representations of the meaning to be conveyed by the sentence and/or its desired linguistic structure. Dynamic creation means that the system can do sensible things in unusual cases, without needing the developer to explicitly write code for every boundary case. It also allows the system to linguistically "optimize" sentences in a number of ways, including reference, aggregation, ordering, and connectives. One of the problems of this approach is that it does not require to know a-priori the dimensionality of the feature space i.e., the columns names. Therefore, this approach will be problematic in the process of mapping the data after it is received because each time it will perform a different mapping.

Yet another approach is dynamic document creation. While dynamic sentence generation works at a certain "micro-level", the dynamic document creation operates on a "macro-writing" task and produces a document which is relevant and useful to its readers, and also well-structured as a narrative. The implementation depends on the goal of the generated text. For example, a piece of persuasive writing may be based on models of argumentation and behavior change to mimic human rhetoric; and a text that summarizes data for business intelligence may be based on an analysis of key factors that influence the decision. The problem with this approach is the it creates a document oriented on a "macro-view". However, there is a need for a technical solution that will operate without argumentation or any other behavior which mimic human being writing. The needed technical solution should generate an easy to read text for investigators and/or SMEs and to present this generated text in a concise simple manner that will support industrial requirements to utilize and expedite financial investigations in scale.

The information generated from SAR filings plays an important role in identifying potential illegal activities such as money laundering and terrorist financing and assists law enforcement in detecting and preventing the flow of illicit funds through our financial system. It is critical that the information provided in a SAR filing be as accurate and complete as possible. The SAR form should include any information readily available to the tiling institution obtained through the account opening process and during due diligence efforts.

A SAR narrative should identity the five essential elements of information which are; who? what? when? where? and why? of the suspicious activity being reported. The method of operation or how the money has been transferred is also important and should be included in the narrative.

Who is conducting the suspicious activity? While one section of the SAR form calls for specific suspect information, the narrative should be used to further describe the suspect or suspects, including occupation, position or title within the business, and the nature of the suspect's business (es). If more than one individual or business are involved in the suspicious activity, identify all suspects and any known relationships amongst diem in the Narrative Section.

While detailed suspect information may not always be available, e.g., in situations involving non-account holders, such information should be included to the maximum extent possible. Addresses for suspects are important; filing institutions should note not only the suspect's primary street addresses, but also, other known addresses, including any post office box numbers and apartment numbers when applicable. Any identification numbers associated with the one or more suspect other than those provided earlier are also beneficial, such as passport, alien registration, and driver's license numbers.

What instruments or mechanists are being used to facilitate the one or re suspects and one or more transactions? The following list of instruments or mechanisms that may be used in suspicious activity may include for example, wire transfers, letters of credit and other trade instruments, correspondent accounts, casinos, structuring, shell companies, bonds/notes, stocks, mutual funds, insurance policies, travelers checks, bank drafts, money orders, credit/debit cards, stored value cards, and/or digital currency business services.

In addition, several different methods may be employed for initiating the negotiation of a financial activity such as fund. For example, the Internet, phone access, mail, night deposit box, remote dial-up, couriers, or others. In summarizing the flow of funds, the following elements should be included: the source of the Rinds i.e., origination that lead to the application for, or recipient use of, the funds as beneficiary. In documenting the movement of funds, all account numbers should be identified at the financial institution affected by the suspicious activity and when possible, provide any account numbers held at other institutions and the names; locations of the other financial institutions, including Money Services Businesses (MSB)s and foreign institutions involved in the reported activity.

The time when the suspicious activity took place should be specified in the SAR. If the activity takes place over a period of time, then the date when the suspicious activity was first noticed should be indicated and the duration of the activity should be described. Filers often provide a tabular presentation of the suspicious account activities, i.e., in and out transactions. While this information is useful and should be retained, objects, tables, formatted spreadsheets should not be inserted when filing a SAR. These items may not convert properly when keyed in or merged into the SAR System. Also, in order to better track the flow of funds, individual dates and amounts of transactions should be included in the narrative rather than just the aggregated amount.

The place where the suspicious activity took place should be specified in the SAR. The Narrative Section may be used to indicate that multiple offices of a single financial institution were involved in the suspicious activity and the addresses of those locations should be provided. If the suspected activity or one or more transactions involve a foreign jurisdiction it should be specified. As well as the name of the foreign jurisdiction, financial institution, address and any account numbers involved in, or affiliated with the suspected one or more activities or one or more transactions.

The reason why the filer thinks that the activity is suspicious should be included in the SAR. An activity is considered suspicious according to the industry or business depository institution, casino, mortgage broker, securities broker, insurance, real estate, investment services, money remitter, check casher, etc. and why the activity or transaction is unusual for the customer; consider the types of products and services offered h the industry, and the nature and normally expected activities of similar customers.

There are some common patterns for suspicious activity. For example, lack of evidence of legitimate business activity, or any business operations at all, undertaken by many of the parties to the transaction(s); unusual financial nexuses and transactions occurring among certain business types e.g., food importer dealing with an auto parts exporter; transactions that are not commensurate with the stated business type and/or that are unusual and unexpected in comparison with the volumes of similar businesses operating in the same locale; unusually large numbers and/or volumes of wire transfers and/or repetitive wire transfer patterns; unusually complex series of transactions indicative of layering activity involving multiple accounts, banks, parties, jurisdictions; suspected shell entities: bulk cash and monetary instrument transactions; unusual mixed deposits of money orders, third party checks, payroll checks, etc., into a business account; transactions being conducted in bursts of activities within a short period of time, especially in previously dormant accounts; transactions and/or volumes of aggregate activity inconsistent with the expected purpose of the account and expected levels and types of account activity conveyed to the financial institution by the accountholder at the time of the account opening; beneficiaries maintaining accounts at foreign banks that have been subjects of previous SAR filings; parties and businesses that do not meet the standards of routinely initiated due diligence and anti-money laundering oversight programs unregistered/unlicensed businesses; transactions seemingly designed to, or attempting to avoid reporting and recordkeeping requirements; and correspondent accounts being utilized as "pass-through" points by foreign jurisdictions with subsequent outgoing funds to another foreign jurisdiction In the SAR it should be determined how the suspicious activity had occurred. It is determined according to the "modus operandi" or the method of operation of the subject conducting the suspicious activity. How the suspect transaction or pattern of transactions was committed and a full picture of the suspicious activity involved. For example, if what appears to be structuring of currency deposits is matched with outgoing wire transfers from the accounts, the SAR narrative should include information about both the structuring and outbound transfers including dates, destinations, amounts, accounts, frequency, and beneficiaries of the fund's transfers.

The information in the SAR narrative should be organized when all applicable information is gathered, analyzed, and documented and the financial institution decides that a SAR is required. Also, the information should be described in the SAR narrative in a concise and chronological format. It has to include all the elements discussed above, as well as any other information that may assist taw enforcement. The narrative may be divided into three sections: an introduction, a body which includes information supporting why the SAR was filed, and a summary or a conclusion.

The introductory paragraph may provide: the purpose of the SAR and a general description of the known or alleged violation; the date of any SAR(s) filed previously on the suspect or related suspects and the reason why the previous SAR(s) was filed; whether the SAR is associated with the Office of Foreign Assets Control's (OFAC) sanctioned countries or Specially Designated Nationals and blocked persons or other government lists for individuals or organizations; and any internal investigative numbers used by the financial institution which may be a point of reference for law enforcement should the investigators wish to contact the institution; and a summary of the "red flags" and suspicious patterns of activity that initiated the SAR.

The body may include any and all relevant facts about the parties, individuals and businesses, who facilitated the suspicious activity or transactions. It should include any unusual observations such as suspected shell entities; financial activities which are not commensurate with the expected normal business flows and types of transactions; unusual multiple party; relationships; customer verbal statements; unusual and/or complex series of transactions indicative of layering; lack of business justification and documentation supporting the activity; etc.; a specific description of the involved accounts and transactions, identifying if known, both the origination and application of fluids (usually identified in chronological order by date and amount); breaking out larger volumes of financial activity into categories of credits and debits, and by date and amount; transactor and beneficiary information, providing as much detail as possible, including the name and location of any involved domestic and/or international financial institution(s); names, addresses, account numbers, and any other available identifiers of originator and beneficiary one or more transactors and/or third parties or business entities on whose behalf the conductor was acting; the date(s) of the transaction(s); and amount(s); an explanation of any observed relationships among the transactors (e.g., shared accounts, addresses, employment, known or suspected business relationships and/or frequency of transactions occurring amongst them; appearing together at the institution and/or counter); specific details on cash transactions that identify the branch(es) where the transaction(s) occurred, the type of transaction(s), and how the transaction(s) occurred (e.g., night deposit, online banking, ATM, etc.); and any factual observations or incriminating statements made by the suspect.

The conclusion summarizes the report and might include: information about any follow-up actions conducted by the financial institution, e.g., intent to close or closure of accounts, ongoing monitoring of activity, etc.; names and telephone numbers of other contacts at the financial institution if different from the point of contact indicated in the SAR; a general description of any additional information related to the reported activity that may be made available to law enforcement by the institution; and names of any law enforcement personnel investigating the complaint who are not already identified in another section of the SAR.

Current approaches to generate text from data in tabular form implement extractive models which makes the generation of SARs, i.e., generate narrative from data in tabular form, impossible for the reasons detailed below.

First, current approaches leave blanks in, missing fields in, each record of the financial transaction. Accordingly, there is a need for a computerized method that will detect fields with missing values based on previous and upcoming records and complete with high level of accuracy the missing field. In case of missing values, the method should initially put NULL instead of the blank and not zero and later on omit the NULL e.g., ignore the fields with the NULL value in the calculation of the sum for the summary section of the SAR.

Second, current approaches to transform high-dimensional data in tabular form into easy to understand text such as the narrative in SAR, are making mistakes in the order of words or even fail to create two sentences, when handling long records. Therefore, there is a need for to method that will handle long records having long sequence fields and generate sentences with words in an expected order i.e., low error rate and create a second sentence if needed. For example, when most of the records are in tabular form and it has to depict a standard story out of a money transfer from one bank to another, some records may contain more columns information, such as that in the very moment of money transfer, the operation was rejected and the money has been sent back. The fact that the money has been sent back is an additional story which is also embedded in the record in addition to the money transfer attempt.

Third, since there is a huge volume of financial transactions which are evidence and should be reported under Anti Money Laundering (AML) regulations, an automatic generation of a two-pan readable SAR from high-dimensional data in tabular form, requires the processing of high-speed streaming data and should be conscious to computing resources limitations. To accommodate computing resources limitations, there is a need for a technical solution that will reduce run-time complexity and storage space for example, by applying SimpleNLG text summarization on a high-quality generated text of a Seq2Seq approach and provide an accurate picture of an overall story of the financial crime investigation.

Fourth, current approaches and methods can process only several types of financial transactions with no mistakes. Therefore, there is also a need for a technical solution that will process high cardinality of financial transaction types.

According to some embodiments of the current disclosure, to overcome the above-mentioned flaws and defects of current approaches, the current disclosure implements a generative model, based on convolutional Seq2Seq architecture which is more efficient than the conventional RNN Seq2Seq models.

Figure 2:
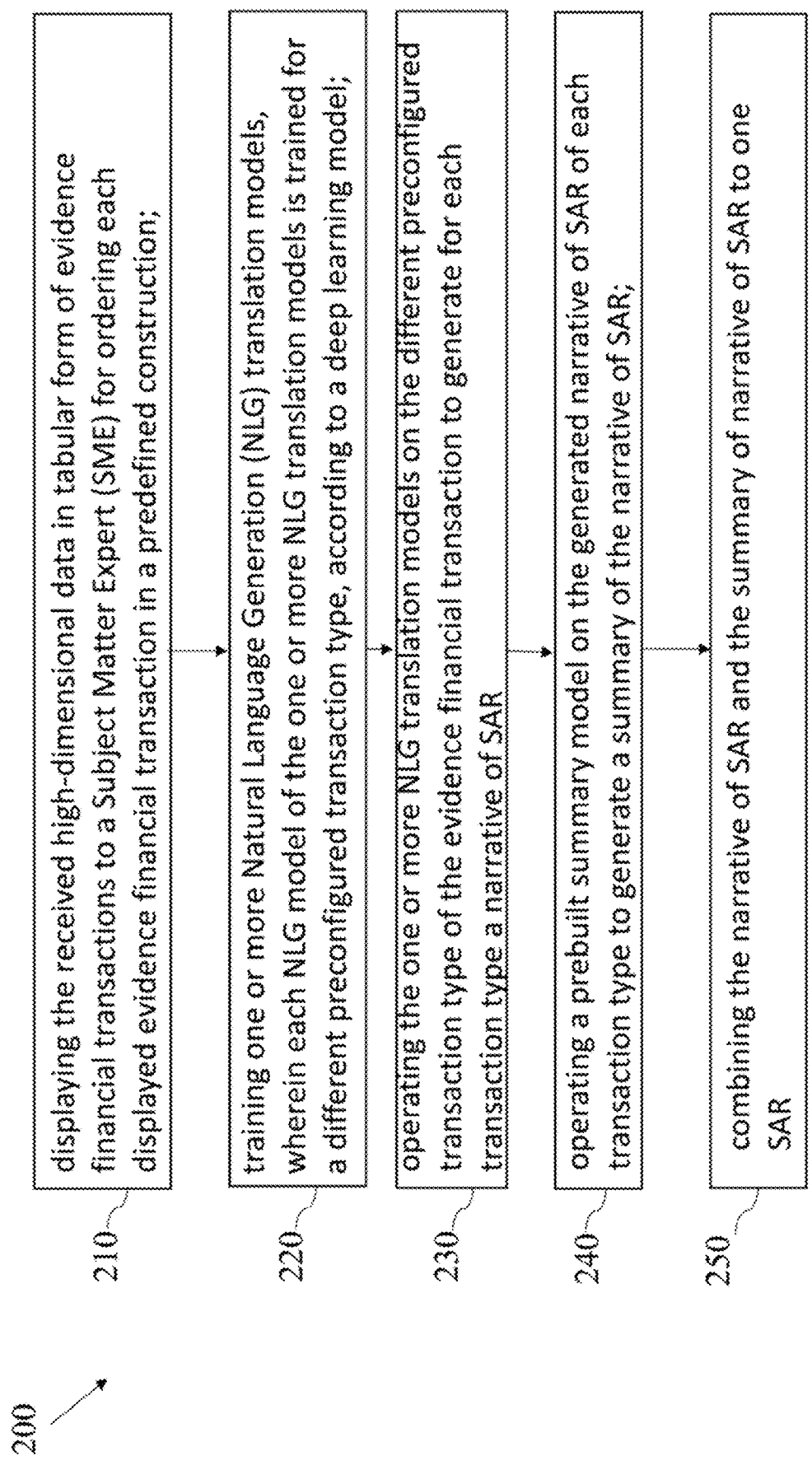
FIG. 2 is a high-level workflow of a method for automatically generating a two-part readable Suspicious Activity Report (SAR) from high-dimensional data in tabular form, in accordance with some embodiments of the present disclosure.

According to some embodiments of the current disclosure, to overcome the problem of current approaches which leave blanks in missing fields in each record of the financial transaction an automatic generation of a two-part readable Suspicious Activity Report (SAR) from high-dimensional data in tabular form is provided herein such as 100 in FIG. 1 and 200 in FIG. 2.

According to some embodiments of the current disclosure, the automatic generation of a two-part readable Suspicious Activity Report (SAR) from high-dimensional data in tabular form is provided herein such as 100 in FIGS. 1 and 200 in FIG. 2 implements a seq2Seq convolutional autoencoder which encodes a sequence of features i.e., fields into a latent vector of fixed size, and the decoder may reconstruct it one part at a time, resulting in a sequential assembly. The latent space formed by the seq2Seq encoder encodes part structure. The decoder may be adapted to perform several generative tasks including categorical and/or numeric auto-encoding, interpolation, novel structure sentence generation, and sentence reconstruction, where the generated tokens are all composed of meaningful parts. Thus, overcoming the problem of missing fields by omitting them with their relevant parts.

For example, the sentence 'a sum of 10$ transferred from bank A to Bank _____'. May be constructed by omitting the second bank name and instead generating 'a sum of 10$ transferred from Bank A at Oct. 10, 2020'.

Furthermore, according to some embodiments of the current disclosure the automatic generation of a two-part readable Suspicious Activity Report (SAR) from high-dimensional data in tabular form is provided herein such as 100 in FIG. 1 and 200 in FIG. 2 may overcome the problem of generating long sequences without missing the right order of the generated tokens.

Furthermore, according to some embodiments of the current disclosure the automatic generation of a two-part readable Suspicious Activity Report (SAR) from high-dimensional data in tabular form is provided herein such as 100 in FIG. 1 and 200 in FIG. 2 may operate in batch a large amount of sentences generations i.e., large amount of records, by building a latent vector size and may deconstruct it in a generative manner.

Furthermore, according to some embodiments of the current disclosure the automatic generation of a two-part readable Suspicious Activity Report (SAR) from high-dimensional data in tabular form is provided herein such as 100 in FIG. 1 and 200 in FIG. 2 may overcome the problem of processing high cardinality of financial transaction types without mixing between them, by using convolutional encoder.

FIG. 1 schematically illustrates an automatic generation of a two-part readable Suspicious Activity Report (SAR) from high-dimensional data in tabular form 100, in accordance with some embodiments of the present disclosure.

According to some embodiments of the current disclosure, a Suspicious Activity Monitoring (SAM) system may capture suspicious financial transactions which may be later on examined. The financial transactions which are verified as financial crime i.e., evidence, may be stored in a data storage such as evidence transactions from alerts on suspicious financial activity 110. The data storage may be Amazon S3.

According to some embodiments of the current disclosure, high-dimensional data in tabular form of evidence financial transactions to be reported under Anti Money Laundering (AML) regulations may be retrieved from a data storage such as evidence transactions from alerts on suspicious financial activity 110 to be displayed to a an end-user such as a Subject Matter Expert (SME). The SME may order each displayed evidence financial transaction in a predefined construction i.e., Suspicious Activity Report (SAR) template 120.

According to some embodiments of the current disclosure, training one or more Natural Language Generation (NLG) translation models such as translation models 130 on the evidence financial transactions in the predefined construction. Each NLG model of the one or more NLG translation models 130 may be trained for a different preconfigured transaction type, according to a deep learning model.

According to some embodiments of the current disclosure, the deep learning model may be a convolutional Seq2Seq model which may implement a hierarchical attention mechanism.

Figure 3:
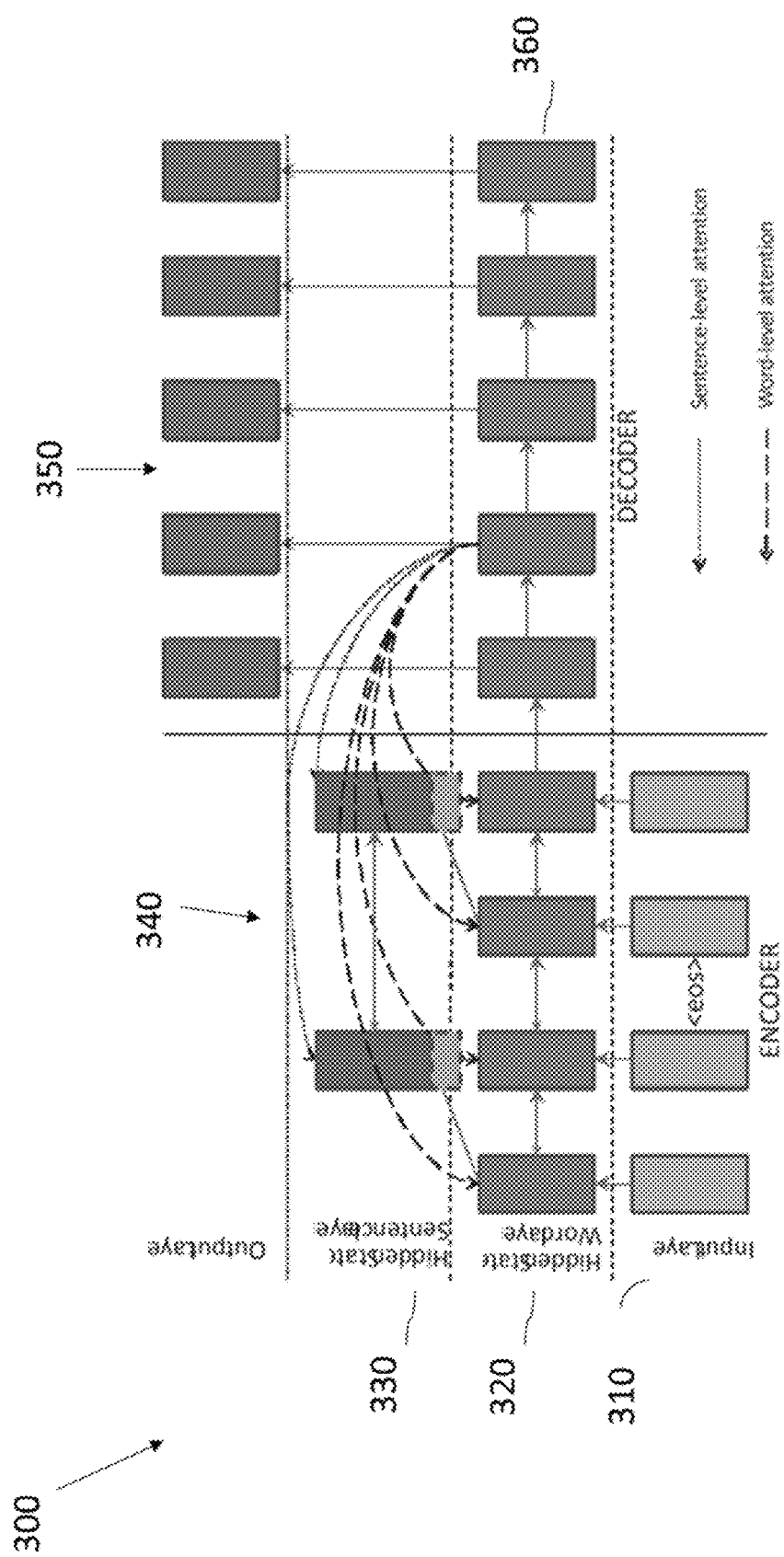
FIG. 3 illustrates a hierarchal attention mechanism, in accordance with some embodiments of the present disclosure.

According to some embodiments of the current disclosure, the hierarchical attention mechanism such as the hierarchical attention mechanism 300 in FIG. 3 may be implemented to simultaneously operating on both the keyword and the key sentences level for the summary part of the SAR. The convolutional Se2Seg model may be applied on both words and sentences level.

According to some embodiments of the current disclosure, in the encoder, such as encoder 340, after calculating the sentence-level attention in the hidden state sentence layer such as hidden state sentence layer 330 in FIG. 3 by the hierarchical attention mechanism 300 in FIG. 3, it may re-weight the corresponding word-level attention which has already computed in the hidden state word layer such as hidden state word layer 320 in FIG. 3. Then the whole attention score may be renormalized according to Equation 1:

$$Q^n(j) = \frac{Q_w^a(j)Q_s^n(s(j))}{\sum_{i=1}^{N_d} Q_w^a(i)Q_s^a(s(i))}.$$

Whereby.

$Q_w^a(j)$ is the attention weight of word level appearing at jth position, s(j) denotes the ID of the sentence at jth word position $Q_s^a$ (s(j)), $Q_s^a$ (i) is the sentence-level attention weight for the ith sentence in the origin, Nd denotes the number of the words in the origin text, $Q^a$ (j) origin text, $Q^a$ (j) denotes the attention score after re-scaling at the j-th word position.

According to some embodiments of the current disclosure, the attention score may be utilized to compute the attention weighted context embeddings which is further fed into the hidden state such as hidden state 360 in FIG. 3 of the decoder such as decoder 350.

According to some embodiments of the current disclosure, the implementation of the hierarchical attention mechanism may reduce runtime complexity and storage space because it has the ability to remember in its memory large amount of unique key features practically, the names of the columns, to preserve the financial transaction accurate order while encoding-decoding it with Swq2Seq approach.

According to some embodiments of the current disclosure, the implementation of the hierarchical attention mechanism may also enable the handling of long records having long sequence fields and generating sentences with words in an expected order i.e., low error rate and create a second sentence if needed. That is, long generated sequences with the correct order of elements or tokens.

According to some embodiments of the current disclosure, the Seq2Seq model may further implement a copying mechanism to handle Out Of Vocabulary (OOV) words.

According to some embodiments of the current disclosure, in text summarization task, to improve embedding quality and decrease the size of the softmax operation layer in decoder, it commonly selects a relatively small quantity of words with high frequency. However, it ignores rare words, thus those keywords or key sentences containing Out Of Vocabulary (OOV) words are ignored and not being predicted. Therefore, a copying mechanism that allows the Seq2Seq model to extract those OOV words from the original document may be implemented.

According to some embodiments of the current disclosure, the copying mechanism may be based on the fact that keywords or key sentences may be identified via a position or syntactic information of the original text, even when not knowing their exact meanings. With copying mechanism, the prediction probability of new word $t_i+1$ may be separated into two components. One component may be the generative probability introduced in the above section, i.e., convolutional Seq2Seq model. The second component may be the words that are directly copied, from the original document. According to Equation 2:

$$p(t_{i+1}|t_1, \ldots ,t_i,x) = p_g(t_{i+1}|y_1, \ldots ,t_i,x) + p_c(t_{i+1}|t_1, \ldots ,t_i,x)$$

According to some embodiments of the current disclosure, each word may be assigned with a weight in the original document by the copying mechanism. Such weight is able to evaluate the word's importance via positional attention score. As mentioned above, Seq2Seq model may be limited to produce the keywords or key sentences from the vocabulary.

However, the implementation of the copying mechanism enables the convolutional Seq2Seq model to not only extract OOV words, but also extract present words since most keywords or key sentences exist in the original document. The detailed equation to compute the copying component is shown as Equation 3:

$$p_c(t_{i+1} | t_1, \ldots , t_i, x) = \frac{1}{Z} \sum_{j:x_j = t_i} \exp(\Psi_c(x_j)), t \in \chi,$$

Whereby, $\Psi_c(x_j) = \sigma(h_j^T W_c) s_t$, $\chi$ is the OOV words extracted from the original document, σ or denotes a non-linear function, $W_c \in R$ denotes a matrix with learnable parameters, and Z is the summation of all scores, which denotes the normalization operation.

The advantages of the implementation of the convolutional approach to Seq2Seq with attention optimization mechanism are as follows: (i) Seq2Seq model can map sequences of different lengths to each other. It is significant because the inputs and outputs are not correlated and their lengths can differ, (ii) the implementation of the attention optimization mechanism overcomes the failure to process long sentences, (iii) it performs abstractive summarizing tasks; (ivy it performs an effective learning compositional structure of a language; and (v) parallelly generates a hierarchical representation.

According to some embodiments of the current disclosure, building a summary model such as build summary model using NLGSimple model 140, may be performed.

According to some embodiments of the current disclosure, operating, the one or more NLG translation models on the different preconfigured transaction type of the evidence financial transaction to generate for each transaction type a narrative of SAR and operating the NLGSimple model on the generated narrative of SAR of each transaction type to generate a summary of the narrative of SAR 150.

The implementation of the NLGSimple provides the ability to: (i) change the tense of the sentence; (ii) support for aggregation of data; and (iii) generate a readable and meaningful text. However, it requires a well formatted input which is provided by the convolutional Seq2Seq approach which is operating on each transaction type of the evidence financial transaction.

According to some embodiments of the current disclosure, the automatic generation of a two-part readable Suspicious Activity Report (SAR) from high-dimensional data in tabular form may further comprise combining the plurality of narratives of SAR and the summary of the plurality of narratives of SAR to one SAR 160.

According to some embodiments of the current disclosure, each one of the different preconfigured transaction types may be at least one of: international, domestic, Automated Clearing House (ACH) and Peer to Peer (P2P) transfers, and each one of the different preconfigured transaction types may be performed via a channel. The channel may be selected from: web, mobile, phone, branch, Application Programming interface (API), Automated Teller Machine (ATM) and Point Of Sale (POS).

According to some embodiments of the current disclosure, the summary may be generated according to key features. The key features may be selected from: a total amount of transferred money from a first preconfigured bank to a second preconfigured bank, a total number of transfers from the first preconfigured bank to the second preconfigured hank or any other aggregated data.

FIG. 2 is a high-level workflow of a method for automatically generating a two-part readable Suspicious Activity Report (SAR) from high-dimensional data in tabular form 200, in accordance with some embodiments of the present disclosure.

According to some embodiments of the current disclosure, the method 200 may comprise operation 210, which may comprise displaying the received high-dimensional data in tabular form of evidence financial transactions to a Subject Matter Expert (SME) for ordering each displayed evidence financial transaction in a predefined construction.

According to some embodiments of the current disclosure, the method 200 may comprise operation 220, which may comprise training one or more Natural Language Generation (NLG) translation models on the evidence financial transactions in the predefined construction, Each NLG model of the one or more NLG translation models may, be trained for a different preconfigured transaction type, according to a deep learning model.

According to some embodiments of the current disclosure, the method 200 may comprise operation 230, which may comprise operating the one or more NLG translation models on the different preconfigured transaction type of the evidence financial transaction to generate for each transaction type a narrative of SAR.

According to some embodiments of the current disclosure, the method 200 may comprise operation 240, which may comprise operating a prebuilt summary model on the generated narrative of SAR of each transaction type to generate a summary of the plurality of narratives of SAR.

According to some embodiments of the current disclosure, the method 200 may comprise operation 250, which may comprise combining the plurality of narratives of SAR and the summary of the plurality of narratives of SAR to one SAR.

According to some embodiments of the current disclosure, for an input sequence $x=(x_1, \ldots, x_m)$, the computerized-method such as 200 in FIG. 2 may represent it as a low dimensional vector $u=(u_1, \ldots, u_m)$, where $u_j \in R\char`^d$. When tabular data is generated, it goes through some sort of encoding process by which a number represents some data/tokens/categorical numerical info. 'R' represents real numbers in dimension 'd'. As for the position embeddings, a one-hot vector may be obtained to record the absolute position of an element in a sequence and may create a sparse and discrete representation of the financial transaction. Whereby is the dimension of the position embeddings and input sequence element embeddings.

According to some embodiments of the current disclosure, the computerized-method such as 200 in FIG. 2 may use an embedding layer to transform the sparse and discrete representation into a continuous embeddings as $p=(p_1, \ldots, p_m)$ where $p_j \in R\char`^d$, thus enabling the computerized-method such as 200 in FIG. 2, to sense which parts of the sequence are being processed.

According to some embodiments of the current disclosure, the computerized-method such as 200 in FIG. 2 may use the combination of both embeddings to form an input element embeddings $e=(u_1+p_1, \ldots, u_m+p_m)$.

According to some embodiments of the current disclosure, the convolutional layer architecture may be shared on both the encoder and the decoder which may calculate intermediate states via the input elements. We represent the output of lath layer as $z^l=(z_1^l, \ldots, z_m^l)$ for encoder and $h^l=(h_1^l, \ldots, h_n^l)$ for the decoder.

According to some embodiments of the current disclosure, each layer may consist a one-dimensional convolution and a non-linearity, if a decoder has one layer with kernel width being 'k', then its output $h_i^l$ will compress the information of 'k' input elements.

According to some embodiments of the current disclosure, to enlarge the length of input elements, blocks may be stack over each other, for example, stacking 6 blocks with k=5 may represent 25 input elements because when k=5, 5 elements are always in process, and the rest of the blocks are stacked, therefore, (6*5)−5=30−5=25. When needed, the computerized-method such as 200 in FIG. 2 may handle non-linearities by processing the entire input sequence or only a few elements in the input sequence.

According to some embodiments of the current disclosure, the computerized-method such as 200 in FIG. 2 may operate in parallel on several elements, thus, being more efficient than a traditional RNN model which is operating in a sequential order, one element by one element. To represent an input sequence with 'n' words, CNNs only requires $O(n/k)$ operations, while RNNs requires $O(n)$ operations.

According to some embodiments of the current disclosure, in each convolution kernel, the parameters may be $W \in R^{2d \times od}$, $b_w \in R^{2d}$. The input may be represented as $X \in R^{o \times d}$, which is a matrix having 'o' input elements with the dimension being 'd'. Whereby, 'R' represents real numbers in dimension 'd'. Then, the input may be mapped by the layer to get the output being a single element $Y \in R^{2d}$ with its dimension twice of that of the input. Then, the outputs elements may be fed to the subsequent layers of the convolutional Seq2Seq model.

According to some embodiments of the current disclosure, the Gated Linear units (GLU) may be leveraged as non-linearity, which may be applied on the output and may be represented as $Y=[A\ B] \in R^{2d}$ in Equation 4:

$$v([AB])=A \otimes \sigma(B),$$

Whereby,

A, $B \in R^d$ as inputs, $\otimes$ denotes the element-wise multiplication.

$Y \in R^{2d}$ is twice the size of the output $v([A\ B]) \in R^d$.

$\sigma(B)$ is the gate that controls which inputs A of the source text are currently dealt with.

According to some embodiments of the current disclosure, to realize a deep CNN, the residual connection which connect the input of each convolution a layer with the output may be adopted as shown is Equation 5:

$$h_i^l = v(W^l[h_{i-o/2}^{l-1}, \ldots, h_{i+o/2}^{l-1}] + b_w^l) + h_i^{l-1}.$$

According to some embodiments of the current disclosure, the implementation of the encoder may pad the input by o−1 elements at each layer with zero vectors on both the left and the right, to ensure that the output of the convolution blocks matches the input elements length. Since no future information should be added to the decoder, 'o' elements at the end of the convolution output may be removed.

According to some embodiments of the current disclosure, linear mappings may be applied on the second convolution outputs so as to fit the embedding with its dimension being 'f'. The encoder may ensure that the output of the convolution blocks matches the input elements length, the input may be padded by o−1 elements at each layer with zero vectors on both the left and the right, Specifically, since no future information should be added to the decoder, 'o' elements at the end of the convolution output may be removed. Furthermore, linear mappings on the 2d convolution outputs may be applied so as to fit the embedding with its dimension being 'f'. Such project is used to 'w' when the input embeddings are fed to the encoder. It is also used to encode output $z_j^i$ to compute the attention scores, along with the final layer of decoder before the soft max operation layer h^L.

According to some embodiments of the current disclosure, the distribution on 'T' possible next target elements $t_i+1$ may be generated according to Equation 6:

$$p(t_{i+1}|t_1, \ldots, t_i, x) = \text{softmax}(W_s h_j^l + b_s) \in \mathbb{R}^T.$$

Figure 4:
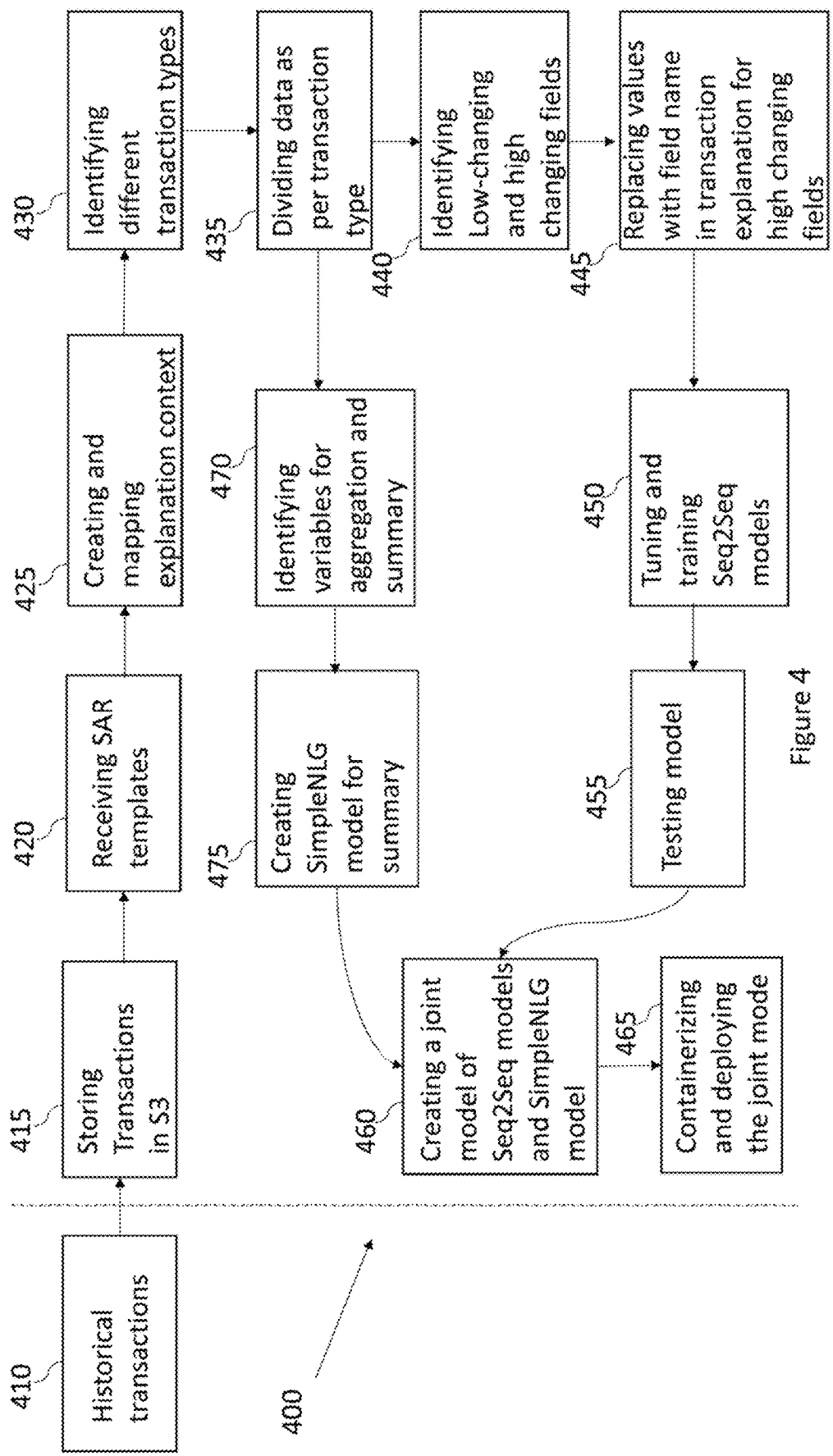
FIG. 4 is a flow chart of an implementation of the method for automatically generating a two-part readable Suspicious Activity Report (SAR) from high-dimensional data in tabular form, in accordance with some embodiments of the present disclosure.

Whereby, $W_s$ denotes the weights in the linear layer and $b_s$ may be the bias, FIG. 4 is a flow chart of an implementation of the method for automatically generating a two-part readable Suspicious Activity Report (SAR) from high-dimensional data in tabular form 400, in accordance with some embodiments of the present disclosure.

According to some embodiments of the current disclosure, a Suspicious Activity Monitoring (SAM) system may store historical transactions 410 in an Investigation database (IDB). Financial transactions which are evidence for report under AML regulations may be stored in a data storage such as Amazon S3 415.

According to some embodiments of the current disclosure, the financial transactions which are evidence for report under AML regulations may be displayed to an end-user such as Subject Matter Expert (SME) and ordered according to a preconfigured template by the SME 420.

According to some embodiments of the current disclosure, then creating and mapping explanation context 425. That is, the data in the preconfigured template may be mapped in order to preserve contingency and logic of the structure for the process of correct identification of the transaction type.

According to some embodiments of the current disclosure, identifying different transaction types 430 such as international, domestic, Automated Clearing House (ACH) and Peer to Peer (P2P) transfers, and each one of the different preconfigured transaction types may be performed via a channel, said channel is selected from: web, mobile, phone, branch, Application Programming Interface (API), Automated Teller Machine (ATM) and Point Of Sale (POS).

Then, method 400 may limiter comprise dividing the data as per transaction type 435. For each financial transaction type identifying low-changing and high changing fields 440 and replacing values with field name in transaction explanation for high changing fields 445. High changing fields are fields where commonly each occurrence is having new values such as timestamp, amount, name etc. Low changing fields are fields that their values rarely change, such as country code, currency code etc.

According to some embodiments of the current disclosure, method 400 may further comprise tuning and training Seq2Seq models 450 and testing the model 455. Then creating a joint model of Seq2Seq models and SimpleNLG model 460 to generate a two-part SAR of narrative section of transactions and transfers and a summary.

According to some embodiments of the current disclosure, method 400 may further comprise containerizing and deploying the joint mode 465 in a financial institution system.

According to some embodiments of the current disclosure, after dividing the data as per transaction type 435, method 400 may further comprise identifying variables for aggregation and summary 470 and creating a SimpleNLG model for summary 475 for the created joint model of Seq2Seq models and SimpleNLG model 460.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications: substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for automatically generating a two-part readable Suspicious Activity Report (SAR) from high-dimensional data in tabular form, said computerized-method comprising:

in a computerized-system comprising a processor and a memory, receiving by the processor, high-dimensional data in tabular form of evidence financial transactions to be reported under Anti Money Laundering (AML) regulations, performing by the processor:

displaying the received high-dimensional data in tabular form of evidence financial transactions to a Subject Matter Expert (SME) for ordering each displayed evidence financial transaction in a predefined construction;

training a plurality of Natural Language Generation (NLG) translation models on the evidence financial transactions in the predefined construction, wherein each NLG model of the one or more NLG translation models is trained for a different preconfigured transaction type, according to a deep learning model;

selectively operating each one of the plurality of NLG translation models based on the preconfigured transaction type of the evidence financial transaction to generate a narrative of SAR for each transaction type, thus yielding a plurality of narratives of SAR, wherein each narrative of SAR is corresponding to each transaction type;

differentially weighting keywords and key sentences for each narrative of SAR in the plurality of narratives of SAR to generate a summary of the plurality of narratives of SAR by applying by the processor the deep learning model, wherein the deep learning model differentially weight keywords and key sentences by implementing a hierarchical attention mechanism that computes attention scores of key words and key sentences in each narrative of SAR, extracting Out Of Vocabulary (OOV) words from each narrative of SAR in the plurality of narratives of SAR for the generated summary of the plurality of narratives of SAR by applying by the processor the deep learning model, wherein the deep learning model extracts OOV words by implementing a copying mechanism that is based on one of: position of a word in the narrative of SAR and syntactic information of the narrative of SAR;

operating a prebuilt summary model on the differentially weighted keywords and key sentences and the extracted OOV words from each narrative of SAR in the plurality of narratives of SAR to generate the summary of the plurality of narratives of SAR; and combining each narrative of SAR in the plurality of narratives of SAR and the generated summary to one SAR, wherein the deep learning model is a convolutional Seq2Seq model.

2. The computerized-method according to claim 1, wherein the prebuilt summary model is using NLGSimple model.

3. The computerized-method according to claim 1, wherein each one of the different preconfigured transaction types is at least one of: international, domestic, Automated Clearing House (ACH) and Peer to Peer (P2P) transfers, and wherein each one of the different preconfigured transaction types is performed via a channel, said channel is selected from: web, mobile, phone, branch, Application Programming Interface (API), Automated Teller Machine (ATM) and Point Of Sale (POS).

4. The computerized-method according to claim 1, wherein the summary is generated according to key features.

5. The computerized-method according to claim 4, wherein said key features are selected from: a total amount of transferred money from a first preconfigured bank to a second preconfigured bank, a total number of transfers from the first preconfigured bank to the second preconfigured bank or any other aggregated data.

6. The computerized-method according claim 1, wherein each evidence financial transaction is having fields categorized as high changing fields and low changing fields.

7. The computerized-method according claim 6, wherein high changing fields are tokenized by an attribute name, and low changing fields are tokenized by a value thereof.

* * * * *